United States Patent [19]

Lever et al.

[11] 4,046,849

[45] Sept. 6, 1977

[54] METHOD OF COMPOUNDING THERMO-PLASTIC POLYMERIC MATERIALS AND FILLERS AND EXTRUDING ONTO ELECTRICAL CONDUCTORS

[75] Inventors: Ray Clarence Lever, Fairfield; Edward Vincent Wilkus, Trumbull, both of Conn.

[73] Assignee: General Electric Company, New York, N.Y.

[21] Appl. No.: 492,965

[22] Filed: July 29, 1974

Related U.S. Application Data

[62] Division of Ser. No. 273,156, July 19, 1972, Pat. No. 3,997,494.

[51] Int. Cl.² .............................................. B29F 3/10
[52] U.S. Cl. .............................. 264/174; 174/110 SR; 174/110 PM; 264/211; 264/349; 427/120; 427/358; 428/379
[58] Field of Search ............... 260/174 CL, 42, 42.29, 260/42.42, 37 MR, 37 SB, 37 PC, 40 R, 38; 264/174, 211, 349; 427/120

[56] References Cited

U.S. PATENT DOCUMENTS 3,148,169  9/1964  Martens et al. ................ 260/42.42
3,372,139  3/1968  Behr ................................. 260/42.42
3,736,173  5/1973  Okada et al. .................... 117/100 C

FOREIGN PATENT DOCUMENTS 2,047,362  12/1971  France

Primary Examiner—James H. Derrington
Attorney, Agent, or Firm—R. G. Simkins; P. L. Schlamp; F. L. Neuhauser

[57] ABSTRACT

A method of compounding thermoplastic polymeric material and fillers, including additives and agents, and unique compounded products. The compounding method comprises mixing the thermoplastic polymeric material in particulate form with particulate filler, and in progressive sequence melting the surface portion of the thermoplastic particles, blending the filler with said molten surface portion of the thermoplastic particles and removing the resultant blended melt and filler from the surface of the thermoplastic particles. The mixing and melting, and the blending and removing, are continued until the filler is substantially assimilated into the polymeric material and the thermoplastic particles become substantially diminished by melting and blending, or the method can be carried further if desired. The compounded product thus prepared is characterized by a distinctive stratified consistency.

15 Claims, 4 Drawing Figures

Prior Art

METHOD OF COMPOUNDING THERMO-PLASTIC POLYMERIC MATERIALS AND FILLERS AND EXTRUDING ONTO ELECTRICAL CONDUCTORS

This is a division of application Ser. No. 273,156, filed July 19, 1972 now U.S. Pat. No. 3,997,494.

BACKGROUND OF THE INVENTION

Typically the compounding of thermoplastic polymeric materials, or admixing of the composition ingredients, is carried out with very costly and massive apparatus, such as a Banbury or similar large volume internal mixer, or an open roll mill. The means and procedures therefore are not unlike those applied in compounding elastomers or rubber generally. In such conventional compounding procedures, large masses of the polymeric or elastomeric material, for example, 300 to 500 pound chunks, are heat fluxed and masticated to reduce the tenacious characteristic of the material to a workable plastic consistency whereupon the other compound ingredients are added and worked through the resulting plastic body with intensive kneading type mixing action.

However, when working with these large batches in typical production apparatus of this type, the overall operation and its control becomes so unwieldy that many commercial manufacturing operations require a combination of two or more types of mixers, such as a Banbury operating in sequence with an open roll mill and followed by a pelletizer, whereby the compounding is carried out in a series of separate means and steps.

Also, the complexity of performing common compounding operations with such apparatus of limited flexibility, creates high manpower requirements as well as rather exacting demands upon the performance of operating personnel. For instance, the intractable consistency of a typical polymeric material, and in turn, its receptivity to blending with the other ingredients is largely dependent upon the internal temperatures and heat control throughout its mass. Moreover, its receptivity to blending may also be influenced to varying degrees by the type and amount of added ingredients, among other possible variable factors. Thus, when handling such large masses of polymeric material as in most commercial operations, internal temperatures throughout a voluminous mass and the dispersion of the added ingredients therethrough without incurring adverse effects, requires a deft balancing of the compound processing conditions. Overmixing tends to degrade polymeric compositions due to excessive mechanical action disruption and/or shearing of the molecular structure of the polymer, and/or over heating of the polymeric material or ingredients contained therewith resulting from the additional heat generated internally from the continued mixing action. Thus, the compounding operation should be gauged so as to terminate the mixing as soon as an adequate degree of dispersion of components through the polymeric mass has been attained.

Moreover, the kneading type of mixing action provided by a Banbury internal mixer or roll mill is not particularly effective in disrupting small agglomerates of finely divided filler ingredients which are commonly encountered due to storage, handling, etc., whereby agglomerates of filler particles are likely to be dispersed and blended with the polymeric material rather than substantially individual particles of filler.

Other mixing systems or apparatus have apparently been tried by the art in compounding thermoplastic materials in an effort to avoid the handicaps of the foregoing common prior art approach, but their application has not been found to provide sufficiently effective and practical blending or cost reductions to replace the prior longstanding systems.

For example, U.S. Pat No. 3,372,139, makes reference to the prior art methods of utilizing "customary mixing apparatus, such as roller mills and mixing kneaders", and then discusses the preparation of curable polyolefin compositions by a different means whereby improved distribution of the curing agent for the polymer is the primary objective. This patent discloses a method of heating a polyolefin material, preferably in powdered form, together with all other ingredients except the curing agent, up to a "sinter point" in a rapidly rotating eddy mixer, then terminating the heating of the mixture and cooling it whereupon the curing agent is introduced with continued mixing. The sinter point is described in this patent as "the vicinity of the softening point of the corresponding polymer" which appears consistent with the standard dictionary definition of becoming coherent by heating without melting. Aside from imposing a significant operational change of reversing from heating to cooling at a stage conditioned upon variable softening temperature ranges for different thermoplastics, with the accompanying responsibility therefor upon operating personnel, it appears that in the method of this patent the thermoplastic powder is softened or sintered whereupon it integrates into a coherent plastic mass not unlike that produced with the more common prior art mixing apparatus such as a Banbury. Morever, the preferred powdered form for the polymeric material called for in the patent is the most expensive form for such materials which adds to cost.

Other prior art disclosures of the use of rapid or high-speed rotating blade mixers, such as the type shown in U.S. Pat. No. 2,945,634, report different effects upon thermoplastic particles and additives. For example, U.S. Pat. No. 3,484,262, as well as an article published in the *Wire Journal*, "Improve Your Dry Blending of Wire Insulation PVC" by G. L. Levy, August, 1971, PP 39 to 43, disclose that such high-speed mixing apparatus or the conditions imposed thereby, referred to as "abrasive adhesion method" in the patent, produce a product wherein the additives such as pigments or fillers become forcibly driven into and physically embedded in the surface of the polymer particles. For instance U.S. Pat. No. 3,484,262 states that the "particles of polymeric material have pigment tightly adhered to its surface portions only, the adherence appearing to involve the entrapment of pigment within surface depressions or indentures in the outer regions of the particle... ", and the author of the article concludes that the high-speed intensive mixing "causes the filler particles to adhere strongly to the surface" of the polymer particles, undoubtedly made more receptive by the softening effect of the plasticizer which was included.

A different approach to the mixing of thermoplastic materials with solid fillers is proposed in U.S. Pat. Nos. 2,445,928 and 2,572,068 wherein the thermoplastic material is melted and a fine spray of the liquid is applied to the solid filler while the solid filler particles are suspended in air by means of strong agitation with an impeller. The exposure of the suspended filler particles to collision contacts with the liquified plastic is said to cause adherence to each other by impact. This process however requires a separate melting system and spray means, among other rather involved equipment components disclosed in these patents.

SUMMARY OF THE INVENTION

This invention comprises an improved method of compounding thermoplastic polymeric materials and fillers, including substantially all types of particulate forms of additives or agents. The method of this invention is very flexible in its application, and essentially free of precise operating conditions or manipulation, thereby reducing the demands upon operating personnel and the likelihood or frequency of any malfunctions. That is, if the compounding method of this invention has not been continued to the point of attaining a sufficient degree of compounding the process can simply be resumed without any degrading effects and carried thereafter to a designed end point. On the other hand, in most instances excessive or over compounding will not be detrimental to the resulting product.

This latitude in the term of the process is primarily attributable to the unique nature of the method of the invention wherein the process need only be carried on, or resumed following an interruption, to the extent of attaining a readily ascertained "end point", but on the other hand may be continued appreciably thereafter, as described hereinafter, with no degrading effect other than a gradual diminishing of the products unique structure as it approaches the physical make up of a substantially continuous phase akin to that of the prior art products, comparable to the substantially homogeneous state obtained by prolonged mixing with a Banbury mixer.

Briefly, the method of compounding of the invention comprises mixing particles of thermoplastic material with particulate filler while melting the surface portions of the thermoplastic particles whereupon the filler blends with the melting surface of the particles and the resultant superficial blend of surface melt and filler is removed from the underlying thermoplastic particles by the attrition of the mixing action. This process of mixing and melting is continued with the successive surface melting, blending of melt and filler and removal of the blended ingredients progressively diminishing the thermoplastic particles and consuming the filler, at least until all filler is substantially expended and the particles of thermoplastic material are substantially diminished by the melting and removal actions. At this level of mixing a compounded product of unique structural system is attained comprising random sized particulate cohesive bodies of the compounded ingredients combined in distinctive physical patterns of discontinuous polyphases interspersed with one another comprising discrete blended phases of polymeric material and filler which includes its polymeric material and filler in stratified arrangements, and interstitial phases substantially of polymeric material. Additional mixing will comminute the random sized particles of the compound to a substantially finer and more uniform range, and extended mixing thereafter will result in a gradual reduction in the discontinuous polyphases of the compound described, while proceeding toward an essentially continuous phase and homogeneous consistency.

This invention further comprises the preparation of curable polymeric compounds and the curing of curable polymeric compounds prepared by the improved method of compounding, and the molding or other manufacture of products from the compounds of this method, both uncured and cured, and in particular the production of electrically insulated conductors utilizing the unique polymeric compounds of the invention wherein their distinctive characteristics are especially significant.

OBJECTS OF THE INVENTION

It is a primary object of this invention to provide an improved method of compounding thermoplastic polymeric materials and fillers, including all additive ingredients or agents, and which is more economical in both equipment costs and in operating expenses, including both reduced operations and manpower requirements.

It is an additional object of this invention to provide a compounding method which is essentially free of sensitive control conditions for thereby minimizing the occurrence of malfunctions, and which is especially adaptable to automatic controls.

It is a still further object of this invention to provide a compounding method which attains a more effective utilization of the filler components by disrupting agglomerates of filler material and dispelling individual particles thereof while effecting the blending and compounding of polymeric material with filler.

It is a further, and particularly significant object of the invention to produce a compound product of a unique physical structure imparting distinctive characteristics and improved performance in certain applications such as electrical insulation.

It is also an objective of this invention to provide improved curable and cured polymeric compounds, and a method of making insulated conductors and the products thereof comprising the compounds of this method.

DESCRIPTION OF PREFERRED EMBODIMENT

Figure 1:
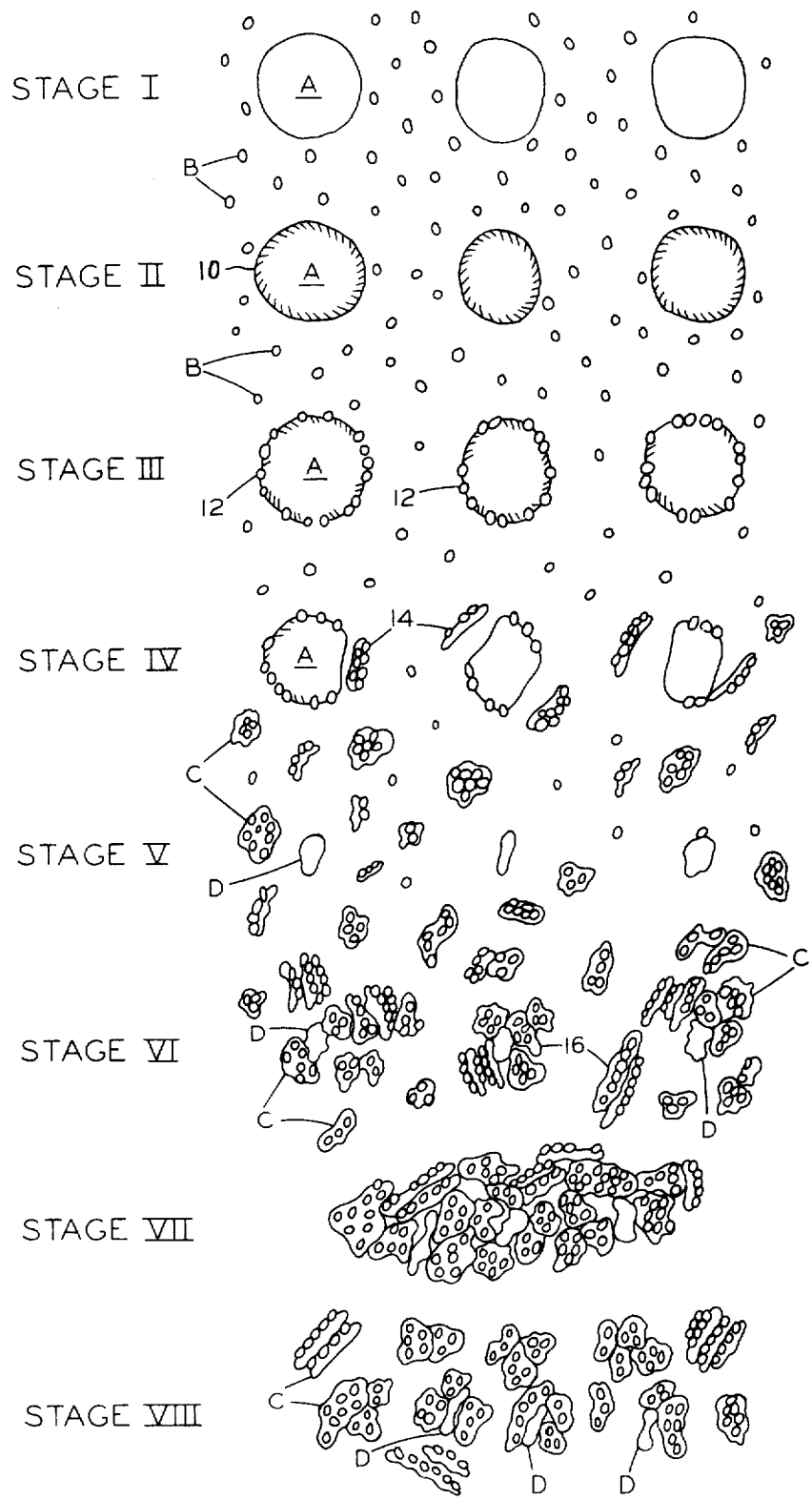
FIG. 1 comprises a schematic diagram illustrating the sequence and stages of the ingredients progressing through the compounding method of this invention.

The method of compounding thermoplastic material and filler of this invention primarily comprises effecting the mixing of particles of thermoplastic polymeric material with particulate filler, and while so mixing, effecting the progressive melting of the surface portion of the thermoplastic particles, whereby the mixing action causes the particulate filler to adhere and blend with the viscid molten surface portions of the thermoplastic particles and also causes the resultant blended polymeric melt and filler to be removed from the polymer particle substructure.

Substantially any type of mixing device providing a sufficient degree of agitation to maintain an extensive intermingling action between the particles of the thermoplastic polymeric material and filler will suffice. However to expedite the carrying out of the overall compounding method, and for reasons which will be made clear whereinafter, it is highly preferred that the mixing be performed in a high energy and high velocity impeller type mixer, such as exemplified by the Henschel mixing apparatus of U.S. Pat. No. 2,945,634, which is adapted for producing a very vigorous intermingling of particles. This type of mixing apparatus generally operates with impeller speeds within the approximate range of about 1000 to 2000 R. P. M.

The heat to effect a melting of the thermoplastic polymeric material particles, can be derived for substantially any source, or combination of sources. It can be either internally generated by the friction of colliding particles or supplied from an external origin, or both, and can also include appropriate preheating of the ingredients through any of such means to accelerate the rate of completing the method. The preferred manner of parcticing the method of this invention comprises the internal generation of at least part of the heat energy required through the intensive attrition of the particles of polymeric material and the action of the filler mixing and colliding together at high energies and velocities. Effective internal heating through particle attrition alone and adequate to produce the required melting for most thermoplastic polymeric materials can be attained with the Henschel type of mixer having a high speed impeller action.

However to increase the rate of carrying out the method, it is preferred to augment the internally generated heat with supplemental heating means, such as heaters or heat sources provided within or about the mixing container to more efficiently and controllably bring the temperature of the thermoplastic material up to its melting range. The use of such multiple sources of heat to accelerate the process rate is particularly significant when compounding some of the higher melting thermoplastic polymeric materials.

In addition to affording the advantages of a practical source of very effective amounts of internally generated heat to support the melting of the thermoplastic polymeric material, the high energy and high velocity impeller type mixers, such as identified above, are most effective in other aspects of the method, and particularly in providing the magnitude or particle attrition and turbulence which rapidly effects the progressive removal of the thermoplastic polymeric particles.

The effect of the mixing and melting operations described, and the physical phenomenon attributable thereto, which comprises the basis of this invention, is hereinafter described with reference to FIG. 1 of the drawing illustrating the sequence and stages of the materials and the effects when compounded according to this invention.

Initially the particles of thermoplastic polymeric material A and particulate filler B simply intermingle and/or collide as a result of the agitating action of mixing, identified as Stage I in FIG. 1 of the drawing, until the temperature of the thermoplastic polymeric particles, due to whatever means, attrition and/or external heat sources, is raised to the melting level of the particular thermoplastic polymeric composition, whereby there is a progressive softening and liquidifying of the surface portions of the thermoplastic polymeric particles. This is shown as Stage II wherein the outer or surface area 10 of the thermoplastic particle A has become essentially molten and thus viscid.

The filler B colliding with the thermoplastic polymeric particles A at this stage is easily blended therewith by adherence of the particles to the receptive soft and molten viscid surface portions of the thermoplastic particles, which effect is shown as Stage III, wherein the tacky surface 10 of polymeric particles A adhesively embraces colliding filler B to effect an outer area 12 of blended filler and polymeric melt composed of a layer of stratum of particles of filler adhering to a surface of molten polymeric material. The attrition of the intermingling and colliding ingredients while mixing produces a continuous removal or flaking off of shell-like sections formed of the blend of filler and polymeric melt due to the firmer mass of the combined blend of filler and polymeric melt 14 separating in fragmentary segments from the immediate underlying soft or fluidized molten polymeric material on the particle substructure. This separation is shown as Stage IV, et seq. These fragmentary segments 14 constitute a new physical phase C of the system, namely, a blend of filler and molten polymer, which typically is in the form of substantially a single layer or stratum of filler particles adhering to a film of viscid melt of polymeric material.

Because of the nature of their formation wherein a layer or stratum of filler adheres to a surface of molten polymeric material, the blended fragmentary segments comprise fundamental units predominantly structured essentially of a stratified layer of filler adhesively embraced by a film-like mass of thermoplastic material. The distinctive compound properties provided by this method are primarily base upon this unique structure throughout the blended phase, or agglomeration thereof, when preserved as pointed out hereinafter.

The mixing of the particles of thermoplastic polymeric matieral A and filler B, and the melting of the thermoplastic polymeric material is continued with the commensurate resultant blend until substantially all the filler has been assimilated by blending with molten polymeric material, and the particles of the polymeric material are substantially expended by melting regardless of any further blending with filler if the filler has previously been consumed. Thus the compounding procedure of this method comprises a continuing action of mixing and melting to effect a progressive blending and removal of the blend from the polymer particles which is carried on until the filler has been substantially consumed by the blending action whereby substantially no free or unblended filler remains, and the particles of polymeric material have been substantially progressively diminshed by melting. Residual molten but substantially unblended polymeric material is shown in Stage V et seq. of FIG. 1 as phase D. Thus the effect upon the materials is a continuing progressive action once reaching the melting range of the particular thermoplastic polymer, but it is not necessary to carry the compounding to completion without interruptions once initiated, and it can be terminated at substantially any stage and subsequently resumed with no discernible effects other than a loss in time.

However, the extent to which the aforesaid mixing process and blending is carried can be conformed to the requirements for given compounded products. For instance, when the compounded product may be subjected to further mixing action such as is encountered in some extrusion apparatus or occures in other processes, it may not be appropriate to continue the mixing action to the extent that the whole amount of the filler is assimilated by blending with the polymeric material, and/or that all polymeric material is expended by melting. Thus for the purpose of defining this invention, it can be said that the mixing process need only proceed to the extent that at least about a majority of greater than 50% of the total filler be assimilated by blending with the polymeric material and also that at least about a majority of greater than 50% of the polymeric material be expended by melting.

The progression of blending filler with molten surface material of the polymeric particles and removal of the blend from the polymeric particle substructure until the filler is substantially consumed and the particles essentially diminished by melting, with the formation of new phases of blend ingredients C and of melted polymeric material D, is shown as Stage V of the drawing. At this stage the product has the feel and consistency of wet sand.

It should be appreciated, moreover, that a two dimensional drawing cannot aptly illustrate the distinctive stratified structure produced by the method in the blended phases comprising a layer or stratum of filler particles united with film-like segments of melted polymer, or the laminated assemblies composed of a plurality of such blended segments agglomerated together.

Apparently due to the generally tacky viscid nature of the melted polymeric constituent during the mixing and melting process, the fragmentary segments of blended ingredients exhibit a marked tendency to rapidly cohere together and thus form random sized agglomerations of the blended phase C alone, and also to unite with bodies of melted polymeric material comprising phase D and thereby producing discontinuous polyphase agglomerates of the blended phase C alone or including melted polymeric phase D interspersed thereabout, as shown in Stage VI, rather than retain their more or less discrete identity as first formed and shown in Stage V. The agglomerated segments typically comprise relatively large soft lumps. However, a brief continuation of the mixing action coupled with a lowering of the material temperature reduces the random agglomerates to a relatively more uniform particle size range, which product is not susceptible to reagglomeration while maintained at temperatures below the polymer melting range.

The compounded product obtained upon carrying the mixing and melting to the extent of assimilating the filler and substantially diminishing the particles of polymeric material by melting, whether the initially formed randomed size agglomerates as shown in Stage VI or as briefly comminuated to a relatively more uniform size range, is made up of a unique polyphase physical system of particulate cohesive bodies or agglomerates 16 of discontinuous phases interspersed with on another comprising discrete blended phases (C) of polymeric material and filler, including stratified arrangements thereof, and some interstitial phases (D) substantially of polymeric material.

The relative proportions of polymeric material and filler as well as the size of the filler or fillers, and the degree of mixing, will determine the extent, if any, of the interstitial phase of substantially polymeric material throughout the system.

On the other hand, continued mixing at approximately the melting temperature level of the polymeric material will result in the particulate cohesive bodies or agglomerates thereof, ultimately coalescing into a large mass or masses which is essentially stable at such mixing condition shown in Stage VII. Termination of the mixing action and cooling produces a body or relatively large units of a distinctive friable consistency whereby the material is then easily fractured into particles by mild agitation with their size range being reduced commensurate with the degree of comminution.

However, if mixing is continued with heating, the material will again coalesce into a single mass or a plurality of large masses which in turn upon cooling return to a friable consistency which can again easily be comminuted into particulate form. The sequence of coalescing and comminuting can be repeated substantially indefinitely without any discernible effects upon the compounded material except for a gradual destruction of the former distinctive polyphase physical system of particulate cohesive bodies of the ingredients combined in discontinuous phases interspersed with one another comprising discrete blended phases C with stratified polymeric material and filler and any interstitial phases D of substantially polymeric material, as the ingredients of the compound become progressively more uniformly dispersed with one another thereby approaching a single phase state of substantial continuous homogeneity. Moreover, by means of extensively repeating the foregoing action, a product similar to that provided with the prior art internal mixers such as a Banbury, but without the need for the substantial apparatus, labor and controlled supervision of the operation, or hazards of over working or over heating, can be obtained with the filler dispersed in a generally uniform pattern throughout a continuous matrix of polymeric material.

Figure 2:
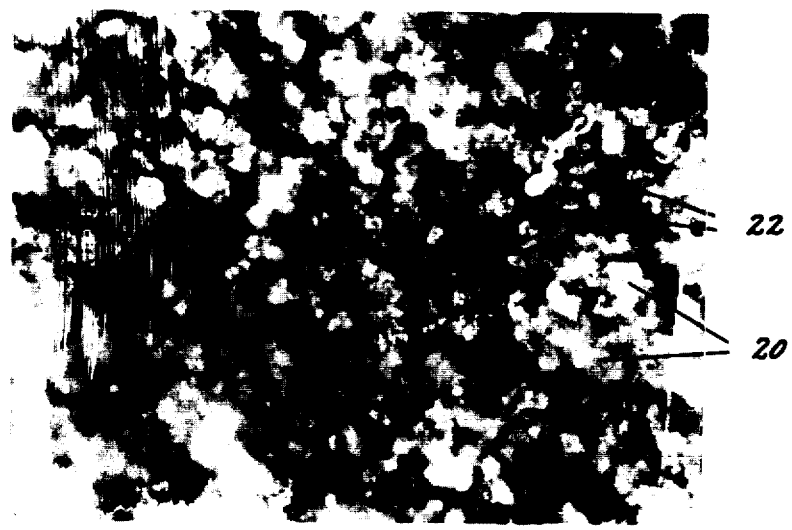
FIG. 2 and 3 are photomicrographs of a transverse section of the same compounded ingredients at 800 X magnification, with FIG. 2 illustrating the continuous homogeneous phase type of product of the prior art, and FIG. 3 illustrating the stratified system of the preferred products of this invention; and, FIG. 4 is a perspective view of a section of metal conductor insulated with a compounded product of the method of this invention.
Figure 3:

The unique stratified structure included in the blending phase referred to hereinbefore, comprises a distinct pattern of layers or strata of filler particles adhering to film-like sections of polymer which is attributable to this method, is demonstrated in photomicrographs illustrated in FIGS. 2 and 3 of the drawing.

FIG. 2 of the drawing comprises a cross-section cut through a filled and cured polymer compound prepared in a conventional manner with a Banbury mixer, and FIG. 3 of the drawing comprises a cross-section cut through the same filled and cured polymer compound material prepared by the method of this invention.

The compound composition of each illustration was a standard production formulation containing polyethylene and clay filler in a weight ratio of two parts polymer to one part clay, and including minor amounts of the usual additives such as preservatives and curing agent. The compounded product of both the conventinal Banbury process and produced by the method of this invention were extruded in an identical manner and thickness onto 14 solid copper wire as an insulation therefor and cured by cross-linking the polyethylene. The wire was removed from the compound insulation of each and like samples were cut for microscopic examination and photographing.

Because the cutting of the samples to expose an internal section tends to mechanically distort the cut surfaces of the material by imposing a superficial orientation in the direction of the cut, the surfaces of the samples exposed by cutting were subjected to a "Low Temperature Ashing" treatment to offset the artificially induced directional alignment of the cut surface area. This treatment was carried out using a Plasmatic Low Temperature Asher Model PL200, and the cut surface of each sample was excited with radio frequency waves that convert diatomic oxygen to monoatomic oxygen which burns away the polymer matrix thereby exposing the internal pattern of the filler. Each sample of the identical compound composition was exposed to this treatment at 30 watts for 1 minute.

The photomicrograph of FIG. 2 of the conventional Banbury produced filled polymeric material exhibits an essentially homogeneous continuous system of filler (the light colored projecting bodies shown as 20) dispersed evenly throughout a matrix of the polymer, (the dark colored background material shown as 22) whereas the stratified pattern of the filler (the light colored projecting bodies in layer shown as 24) and intermediate polymer (the dark colored background material shown as 26) produced by the method of the invention is clearly evident from the photomicrograph of FIG. 3.

The relative proportions of polymeric material and filler amenable to compounding by means of the method of this invention are extensive and thus the method is sufficiently versatile to compound most formulations. In its broader aspects the proportion of filler may effectively range from about 5 to 200 parts by weight per 100 parts by weight of thermoplastic polymeric material. It should be appreciated, however, that factors such as the relative sizes and densities, or more aptly relative bulk densities with respect to some fillers as well as the absorptive capacity and internal structures of certain common fillers such as diatomaceous earth, may have a significant influence upon the relative weight proportions of polymeric material to fillers, and thus may render it expedient or even necessary to adjust the amounts specified. For most commonly used fillers such as clay, the preferred proportion comprises from about 25 to 150 parts by weight of filler per 100 parts by weight of polymeric material. Regardless of the amount of filler, the mixing and melting of the method should be carried, either continuously or intermittently, substantially to the extent of having assimilated substantially all free filler by blending with melted polymeric material, and also of having attained the diminution of substantially all particles of thermoplastic polymeric material through melting.

The filler component need not be present at the beginning of the mixing operation but it must be present to achieve the necessary action of blending and removal of the resultant blend. Thus the filler can be introduced into the mixing system after initiating the agitation and upon approaching or reaching the melting temperature range of the polymeric material, and can be applied gradually throughout the process, continuously or in several increments of either amounts or of kind, if more than one type of filler is compounded.

Ingredients which are physically unstable or in some way susceptible to an unwanted change at temperatures of the melting range of the particular polymeric composition of the compound which constitutes a prevailing condition during the compounding, such as some peroxide cross-linking agents for polyolefins, can be introduced into the product following its compounding and cooling to below the susceptible temperature level for the material to be included and then effectively dispersed through the compounded material by mixing without effecting a substantial increase in temperature. The inclusion of such temperature sensitive ingredients is generally most expeditiously effected by first transferring the hot compounded product to a second mixing unit provided with cooling means, and completing the additions and mixing following an appropriate cooling.

The thermoplastic polymeric materials which can be compounded by the method of this invention comprise substantially all polymeric materials which melt or become soft and relatively fluid-like or viscid upon the application of heat, without undergoing unwanted chemical change, or deterioration and thus are amenable to the process conditions. Examples of some suitable polymeric materials which exhibit sufficient thermoplastic-like properties for the practice of the invention are polyethylene, vinyl resins, polyamides, polyesters, vinylidenes, allyls, styrene, and including uncured elastomers such as neoprene, styrene butadiene, and ethylene propylene. In other words, the method of the invention applies to essentially the same polymeric materials, including many so-called elastomers, amenable to compounding with the prior art means.

The melting temperature conditions for substantially all such thermoplastic polymeric materials are readily obtainable, such as in well-known and widely-used handbooks and similar publications or from the materials vendors or manufacturers. In any case, the melting or softening temperature can very easily be ascertained by simple empirical means. However, the temperature applied during mixing or at any stage of the process should never be so high as to deteriorate or in any way irreparably damage the particular polymer composition, or for that matter any other constituents.

The polymeric material preferably should be in particulate form, as opposed to one or more relatively large bodies or lumps. Beads or pellets of polymeric material sized about 2 to 8 millimeters in diameter (from approximately No. 10 U.S. Sieve Series up to about 5/16 inch in diameter) are preferred because they are conducive to optimizing the compounding method, and constitute the most economical form for the purchase of many polymers. However, the compounding method of this invention is effective with polymeric particles of a wide range of sizes running from relatively fine powder such as particles sized down to about 100 U.S. Sieve Series, up to substantial chucks of about an inch or more in diameter. For instance, thermoplastic particles measuring $10 \times 10 \times 20$ mm were effectively compounded in a kitchen type blender according to the precepts of this invention.

The filler constituents embrace any relatively fine powder-like materials which maintain their dimensional integrity at the temperature levels utilized in the compounding method. The operating temperature level is of course a condition dictated by the melting temperature of the particular polymeric material acted upon, and the filler components must not appreciably soften or deteriorate at the mixing temperature which melts the polymer component to be compounded therewith. Thus a paticular filler composition could be a particularly satisfactory componenet for compounding with some polymers, such as those of a relatively low melting point, and not as effective for use with others such as those having a high melting point. Apt particle sizes, for example, comprise from about 100 U.S. Sieve Series (approximately 149 Micron in diameter) down to about 400 U.S. Sieve Series (approximately 37 Micron) or smaller, such as sub-micron sizes. In the case of fibrous or elongated and irregular shaped fillers, the specified sizes should be applied to the particles smallest cross-sectional dimension. Moreover, due to the mechanism of the compounding action, the fillers should be of a relatively smaller size than the polymeric particles whereby the filler particles can be blended by adherence into the viscid molten surface portions of the polymeric material.

For purposes of this invention, fillers generally comprise all common fillers and solid compounding ingredients or agents used in polymeric compounds. They include materials of natural or synthetic and mineral or non-mineral origin, and of any configuration, such as spheres, plates or fibers, which are available as fine particulate solids and of sufficient thermal resistance to maintain their solid physical structure at least at the melting temperature of the particular polymeric material to be compounded therewith. Typical fillers include clays, carbon black, wood flour either with or without oil, various forms of silica including common sand, glass, metals, and oxides of metals such as aluminum oxide and titanium oxide, magnesium oxide, calcium carbonate, barium carbonate, magnesium carbonate, barium sulfate, antimony trioxide, calcium silicate, diatomaceous earth, Fuller earth, mica, talic, slate flour, volcanic ash, cotton flock, glass fiber, asbestos, and many others, whether primarily utilized for reducing costs, reinforcement, bulking, pigmentation, or for whatever purpose.

Also grouped with such conventional fillers as given above for the purposes of this invention, are all solid compounding ingredients which meet the specified temperature requirements, including but not limited to, such typical and conventional components as vulcanizing agents, accelerators, aging resistors and protective materials such as antioxidants, heat and light stabilizing agents.

Liquid components or those not possessing adequate temperature resistance can be introduced and dispersed following performance of the compounding method and cooling.

The following comprise examples of the compounding method of this invention, including demonstrations of the conditions of applying the method, various materials amenable to the method, and the compounded products derived therefrom. In certain of the examples the compounding method was conducted on a laboratory scale to minimize both the processing time and quantities of material expended, and also to permit closer and more detailed observation and study of the physical occurrences due to the blending phenomenon. In each laboratory scale test, the ingredients were compounded in a kitchen type food blender comprising a Waring blender with an impeller blade speed ranging from about 875 to 1750 R. P. M., or a like device manufactured by General Electric Company. The familiar, common kitchen type food blender comprising a transparent jar mixing container typically of about one liter or more capacity, and provided with a multi-blade high speed impeller in the bottom of the mixing container, constitutes a small scale mixer duplicating the performance and essential construction of a commercial Henschel type mixing apparatus of relatively large capacity. In these runs there was no external heat applied, except when stated that the ingredients were preheated for the purpose of reducing the period of time required for the polymeric material to reach its melting level.

The other exemplary compounding tests were carried out in a commercial Henschel mixer of the type described in U.S. Pat. No. 2,945,634, with a 30 gallon chamber capacity and a jacket about the mixing chamber for heating with steam or cooling with water the contents of the mixing chamber. This mixer had an impeller blade speed of 1700 and 1400 R. P. M. External heat, however, was applied only when so stated in the examples.

EXAMPLE I

This example illustrates the essential interaction of the thermoplastic material with filler by showing the effects of performing the manipulative steps of the method with particles of polyethylene material alone. One hundred grams of polyethylene pellets (R4 low density polyethylene - Sinclair-Koppers Co.) of about 4 millimeters in diameter were added to a standard kitchen type food blender, General Electric Company Model BL10, which was fitted with a mercury thermometer passing through the blender jar cap with its tip projecting down into the loose mass of pellets. This mixer was operated at high speed of about 1500 to 1750 R. P. M., and over a continuous 14 minute period the thermometer reading gradually rose to 90° C., at which point some clumping together of the pellets was observed. On further mixing for an additional 2 minutes the temperature increased further to 97° C. and the entire batch of pellets tended to agglomerate and adhere to the walls of the blender jar outside the reach of the impeller blade.

Over a period of the next 14 minutes of mixing at high speed, the temperature remained substantially constant at 97° C. and essentially no change occurred in the size or shape of the pellets. Clusters of pellets clinging to the walls of the blender jar slowly slid down the jar walls into the reach of the impeller blades where the agglomerated clusters were broken up and the pellets were driven up against the jar walls where they would again agglomerate into clusters clinging to the walls which in turn again slowly slid downward repeating the cycle.

It was apparent from observing the foregoing phenomenon that when mixing thermoplastic polymeric particles alone, the temperature rises until the surface area of the polymeric particles melts and the resultant molten surface film on the particles functions as a lubricant forestalling any further significant temperature increases generated from the mixing action.

EXAMPLE II

One hundred grams of the same low density R4 polyethylene pellets (about 4 millimeters in diameter) and 50 grams of clay (3071 Whitetex Clay) were placed in a Waring kitchen type food blender. Upon mixing at high speed the temperature of the admixture increased as a result of the heat generated by the mixing action up to about 105° C., the approximate melting point of the polyethylene. At that temperature it was unexpectedly observed that the flow characteristics of the mixing batch changed from sluggishness to ready mobility, and that there was a noticeable decrease in the size of the pellets. When the batch temperatures reached 135° C., mixing was stopped and the batch was permitted to cool to about 100° C. Mixing was then resumed and continued until the temperature returned to about 135° C., whereupon it was again stopped and the batch cooled to about 100° C. This alternate heating through the attrition of the vigorous mixing action, followed by cooling through a quiesent period at rest, produced a freeflowing powder product. The product consisted of particles which ranged from very fine up to about 0.5 millimeter in diameter. A sample of this powdered product was pressed at a temperature of 150° C. into a sheet 3 to 5 mills thick which demonstrated that a high degree of blending between the polyethylene material and filler had occurred.

EXAMPLE III

This example illustrates the significance of the temperature of mixing in relation to the particular thermoplastic material utilized in the compounding method. With the same ingredients, the mixing conditions of Example II were repeated including the total mixing time, except that the temperature of the batch was never permitted to exceed 81° C., a temperature level substantially below the melting range of polyethylene. The results were that the polyethylene pellets were essentially unchanged in size or shape, and a sample molded into a sheet showed that essentially no mixing between the polyethylene material and filler particles had taken place. Thus the temperature must exceed the softening point and reach melting levels for the given thermoplastic composition to attain the compounding objective and advantages of this invention.

EXAMPLE IV

The conditions of Example II, with the same ingredients, were again repeated, including the procedure of mixing the ingredients until the batch temperature reached about 135° C., and then alternately cooling to about 100° C., by terminating mixing action. This cycle of mixing and heating, then resting and cooling, was repeated until the powder product formed of the compounded batch ingredients coalesced into a large soft lump which stalled the mixer. Upon cooling, this lump had become a friable sollid which could easily be broken into smaller fragments.

EXAMPLE V

This example of the compounding method of this invention was carried out in a 30 gallon capacity Henschel mixer, Model JSS-35D. The batch ingredients consisted of 33.0 lbs. of the same polyethylene pellets of about 4 millimeters, 16.6 lbs. of clay (3071 Whitetex), 1.65 lbs. carbon black (Thermax MT-R.T. Vanderbilt), and 0.58 lbs. of polytrimethyldihydroquinoline antioxidant (Flectol H-Monsanto). The batch was mixed in the Henschel at high impeller speed (about 1700 R. P. M.) until its temperature reached about 116° C., whereupon the mixer was placed on low speed (about 1400 R. P. M.) and cooling water circulated through the jacket of the mixing container. Then 1.09 lbs. of di- - cumyl peroxide cross-linking curing agent (Di-cup R-Hercules) and 30 cc of silicone fluid were added to the batch, and dispersed therethrough. The mixing was stopped and the batch allowed to cool to about 82° C. whereupon the batch was discharged from the mixer. The compounded ingredients were in the form of a free flowing powder that was found to contain a small amount (about 15 to 25%, by volume) of pellets ranging in size up to 20 × 30 × 6 millimeters. When cut open the pellets were found to be of a uniform black color throughout indicating the dispersion of the carbon black through the blended mass of opaque polyethylene material and white clay filler. Analysis of the pellets established that they contained a polymer-filler percentage composition comparable to that produced with conventional Banbury mixing for the same formulations, and that the method achieved a true compounding of filler into a polymer matrix, and not merely a mechanical tossing or mingling of the particles of polymer and filler.

This compounded product, in each of two forms, was extruded onto wire, one extrusion being made with a sample of the compounded material obtained directly from the mixer, and the other with a sample of the material milled at 190° F. and granulated into small pellets before extrusion. Each extrusion was performed with a Royle 2, 3½ inch extruder and the compound was applied as a 3/64 inch thick covering onto No. 14 solid copper wire. The extruded products were passed directly from the extruder head into a 400° F. steam vulcanizing pipe chamber, containing a downstream water cooling leg. The wire product covered with the compounded polymer and fillers was wound on a take-up reel and then placed in an oven in air for 4 hours at 190° F. The insulation formed of each of these samples of the compounded product was then compared with an insulation of an identical composition prepared with a Banbury in a conventional manner and then formed identically to the other samples.

Samples of each wire material, the directly extruded compound and the hot milled and then extruded compound, and the Banbury prepared compound, were cut into test specimens consisting of 5 feet 5 inches lengths of insulated wire, and the central 3 feet 6 inches section was coated with silver paint to serve as the grounded shield. Silicon carbide paint producing a non-linear electrical stress was applied to each end so as to relive the stress at the silver paint-insulation junction. Each of these samples was then subjected to a voltage stress through a tripping device, which also recorded the individual sample time to breakdown. The maximum stress at the conductor was maintained at 1050 v/mil (r.m.s. valve). The voltage endurance of the samples of compounds prepared above as compared with the voltage endurance results of the same test carried out upon the same compounds prepared in a conventional manner in a Banbury mixer was as follows: The data is given as the mean life in hours of resistance to accelerated testing voltage conditions for 10 separate test units of each of the samples.

| Conventional Banbury Compound | Compound Of The Method Of This Invention | |
|---|---|---|
| | Direct formed | Pre-milled and Pelletized |
| 436 hrs. | 658 hrs | 692 hrs. |

Although an explanation for this improved high electrical voltage resistance of an insulating material compounded pursuant to the method of this invention over that of the same composition derived from the prior art compounding means is not proposed, because of the identity of composition and other circumstances it would seem logical to assume that this greater voltage resistance is in some manner attributable to the unique structural system, including stratification of filler and polymeric material as illustrated, produced by the method of this invention.

EXAMPLE VI

One hundred grams of polyethylene pellets of about 4 millimeters in diameter and 50 grams of calcined clay were added to a two-speed Waring food blender fitted with a mercury thermometer. At high speed mixing (about 1700 R. P. M.) the heat generated from the particle attrition of the mixing action reached a measured temperature of 103° C. in 9 minutes. Then 1.50 grams of vinyl silane was added to the blender, and mixing continued for 2 more minutes to a temperature of 125° C. Mixing was stopped for a period of 2 minutes during which time the temperature dropped to 109° C., then mixing was resumed at high speed for a period of 1 minute with the temperature reaching 122° C., and the mixing was again stopped and the batch cooled with quiescence to 107° C. At this stage 3.0 grams of carbon black (Thermax) was introduced while mixing at high speed for a period of 1 minute with the temperature climbing to 118° C., followed by 3 minutes of quiet with a temperature recession to 104° C. Then 1.75 grams of antioxidant (Flectol H) and 3.30 grams of di-α-cumyl peroxide curing agent (Di-Cup R) were added while mixing at high speed for 1 minute with a temperature increase to 115° C. Mixing was again stopped and three minutes quiescent cooling brought the temperature down to 98° C.

During this continued intermittent mixing and heating, followed by quiescence and cooling, the batch ingredients began agglomerating or caking until they became so coalesced that no further mixing action was observed.

The resultant coalesced batch was further cooled whereupon the blender was turned on to relatively low speed which quickly broke the the coalesced and cooled mass into free-flowing small pellets. With continued mixing the temperature of the mass of small pellets increased to about 100° C., whereupon they again coalesced and blocked mixing. After standing and cooling, the coalesced mass was again broken up by starting the mixer and the mass was comminuted into free-flowing small pellets. This cycle of coalescing with mixing heat, and comminution of the cooled coalesced mass, was repeated six times, and the final small comminuted pellets were retained.

This entire experiment was repeated twice with essentially the same results.

The following examples illustrate the application of the compounding method of the invention to other polymeric materials including elastomers.

EXAMPLE VII

A standard Waring food blender having a mixing jar of one liter capacity fitted with a mercury thermometer extending through the jar cap down into its interior to batch contents level was utilized in this run. The principal fillers comprising 55 grams of clay (Catalpo) with 48 grams of carbon black were first added to the blender and mixed. In about 5 minutes the heat self-generated by mixing the fillers had increased the temperature of these fillers to about 115° C. At this stage a relatively large chunk of neoprene rubber measuring about 10 × 10 × 20 millimeters was dropped into the running blender. There immediately occured sounds characteristic of the piece bounding between the blender impeller and jar walls, but the sounds rapidly diminished with the progressive reduction of the mass of the neoprene piece. Then a second large chuck of neoprene was dropped into the mixing ingredients and the same behavior was noted. Six more pieces of neoprene were then sequentially added, but at an increasingly faster rate. The experiment was then prematurely terminated due to equipment breakage, but upon examination of the insufficiently blended contents all the neoprene had compounded with the fillers except two unchanged pieces and one soft, nearly spherical piece about 3 millimeters in diameter.

EXAMPLE VIII

The conditions of the previous aborted example were repeated as follows: Initially 55 grams of clay and 48 grams of carbon black were mixed in a Waring food blender and in 5.5 minutes the temperature of the mixture had reached 110° C. from the heat of mixing alone. Then 100 grams of neoprene was added in 10 gram increments over a period during which the batch temperature ranged from about 100° to 145° C., allowing each introduced increment to be reduced in size before adding the next increment. Next 3 grams of crystalline hydrocarbon wax (Sunoco Antichek), 3.7 grams of petroleum jelly, (Petrolatum), 2.2 grams of phenylbatanaphthylamine aging inhibitor (Neozone D-du pont), and 15.8 grams of red lead (Pb3O4) were each added to the powdery mixture and blended for several minutes at about 90° C. Then 14.6 grams of hydrocarbon oil (Circo Oil) was added and the resulting powdery batch was mixed for several minutes at a temperature between 110° to 148° C. Half of the batch was removed for examination and the remaining half accelerated by adding 6.6 grams of tetramethylthiuram monosulfide accelerator (Monex-du Pont) and 0.5 grams of sulfer with several minutes of further mixing at about 80° C.

The accelerated batch powder was milled and quickly bonded together. A Mooney plasticity-scorch curve test of this product compared favorably with that for the same formulation prepared conventionally on a Banbury, and a cured slab of the milled powder had a 1100 psi tensile strength, 220% elongation, and 200% modulus of 900 psi.

EXAMPLE IX

A solid block of 100 grams of ethylene propylene rubber polymer (Vistalon 404-Enjay) was cut into large pieces, each about 20 × 15 × 10 millimeters. The pieces of EPR polymer and 50 grams of clay (3071 Whitetex) were placed in the jar of a Waring food blender, and the jar and contents preheated in an air oven at 150° C. for 2.5 hours. Then with high energy and high speed mixing the temperature of the batch contents rose to about 200° C. During this period the batch rheology changed from initial sluggishness at the upper regions with only the material next to the impeller showing significant active motion, to a state of high mobility with turbulant flow behavior resembling that of a liquid although the material was a particulate solid. Concurrently the pieces of EPR polymer gradually reduced in size, and then seemed to disappear. At about the time of the EPR polymer pieces disappearance, the mobility of the mixing particulate batch decreased to the point where the entire batch was essentially a single, stagnant mass, with the rotating impeller laboriously carving out a cavity therein.

On terminating the mixing, the batch as a single mass sagged to the bottom of the mixer and was allowed to stand and cool at about 160° C. Then 20 cc of water was added to the stagnant batch, and the blender was turned on. The mixing action quickly broke up or pulverized the mass into free flowing pellets. After cooling the blender jar, the pellets of the compound were mixed and a small amount of clay was added to insure continuance of pellet separation, followed by the addition of 3.3 grams of di-α-cumyl peroxide curing agent (Di-Cup).

EXAMPLE X

Eighty-seven grams of clay and 87 grams of styrene-butadiene rubber in the form of chunks measuring about 18 × 13 × 13 mm were deposited in a Waring blender jar and heated for 2 hours in an oven at 166° C and at atmosphere of nitrogen to prevent oxidation of the rubber. Following the heating and while maintaining a flow of nitrogen gas into the blender jar, the hot clay and styrene-butadiene rubber were mixed for 4 minutes and the batch temperature rose to 194° C. By regulating the mixing speed the temperature of the batch was maintained within the range of 194° to 197° C for 2.5 minutes whereupon the batch coalesced into a stagnant mass. Mixing as then stopped and the batch permitted to stand and cool for 27 minutes while under nitrogen gas. Next 0.3 grams of clay was added to maintain particle separation following break up of the mass, and mixing was resumed which comminuted the mass into particles with a temperature of about 90° C. Another 0.25 grams of clay was added and the batch was removed from the blender.

The compounded product consisted of roughly spherical particles sized from about 2.5 mm down to very fine. When the larger particles were opened they revealed that the clay filler was dispersed through the particle providing a good blending of the filler with the styrene-butadiene rubber.

The following comprise illustrations of the broad application of the compounding method of this invention to a variety of polymeric and/or elastomeric materials, with a various type and kinds of filler materials, and under different conditions. These examples and data are presented in tabular format to conserve space and minimize duplication. In general, Table I relates to different polymeric and elastomeric materials, Table II relates to examples of fillers, and Table III demonstrates the method with forms and types of polyethylene. The conditions and means of applying the compounding method of this invention in these examples and the subsequent testing means and test data derived therefrom in the tables are defined according to the following legend.

LEGEND FOR TABLES

| | LEGEND FOR TABLES |
|---|---|
| C1, Temp. | Means first mixing cycle where all compounding ingredients, except curing agent, are present. The batch is then mixed to a temperature range (in ° C) and held there while the particulate input polymer gradually diminuates, concommitant with progressive disappearance of loose filler, concommitant with formation of blended particles of filled compound; culminating in a coalesced mass of molten filled compound which becomes friable on cooling. |
| C2, Temp. | Means a second mixing cycle where the cooled, friable material of C1 is broken up into stirrable particles, curing agent added and the particulate mixture stirred and heated until the particles form a coalesced mass, done over a range of temperature in ° C. |
| C3, Temp. | Means third mixing cycle where the cooled, friable material of C2 is again broken up into stirrable particles, again stirred and heated until coalescence, done over a range of temperature in ° C. In addition of curing agents, additional fillers, other additives can be delayed to this stage or subsequent to such mixing cycles. |
| WB | Means Model 1041 or 5011 Waring Blender, one-liter transparent glass jar. Jar cover fitted with mercury thermometer extending downward so mercury bulb is just above impellar shaft. |
| CS | Means cold start. Both jar and ingredients initially at room temperature. |
| MHO | Means mechanical heat only. Heat to melt PE derived only from mechanical mixing action of blender impeller. |
| CBS | Means batch cooled by allowing to stand. |
| VTC | Means temperature controlled by regulating blender impeller speed through a variac transformer in series with blender motor. |
| AA | Means air atmosphere inside blender jar or other compounding chamber. |
| HM | Means Model JSS-35D, 35-gallon Henschel Mixer, variable speeds, with cooling water jacket. |
| CBJW | Means batch cooled by jacket water. |
| Suffix HPP | Means "Hot Pressed Particles". That is, the particles containing no curing agent, were loaded directly into the cavity of a compression molding press and the press slowly closed over several minutes time, followed by cooling the press and removing the test slab (about 75 mils thick) which had been so formed with minimal shearing action. |
| Suffix PCP | Means "Press Cured Particles. Same as HPP", except that the particles contain curing agent and therefore, the slab formed with such minimal shearing action was kept hot in the forming press until cured, before cooling and removing the test slab. |
| Suffix MLD | Means "Milled". That is, the compound particles were briefly masticated on a two-roll mill at a temperature to give a fluxed continuism. The amount of mastication given approximated that which the compound particles would have received by direct feeding into, and passage through, an ordinary extruder, or injection molding device. Then the masticated material was pressed into a cured slab as per Suffix PCP above. |
| $(T/E_o)$ | Means the numerical results from conventional tensile testing done on HPP, PCP and MLD test slabs, or on cured insulation stripped from the metallic conductor. Tensile value represents psi and elongation value, percent; both values obtained on specimens tested at room temperature. |
| $(T/E_H)$ | Means the same as $(T/H_o)$, except that the specimen test temperature was 150° C. Measurable tensile-elongation properties at this temperature indicates that the filled polymeric system is chemically cross-linked or cured. |
| % Tol. Extr. | Means weight percent of the cured specimen that is extractable by immersion in boiling toluene for 24 hours. This test, along with $(T/E_H)$, is useful for determining the presence of chemical cross-linking or cure. |
| SG | Means "Specific Gravity" of the test specimen, and is useful in showing the presence of fillers in the polymeric test specimen. |

In the following formulations 33 clay is a calcined clay, 3071 treated clay is a clay treated with 1% of methyl silicone tetramer according to U.S. Pat. No. 3,148,169, and DIDP is di-isodecyl phthalate.

TABLE I

| Ingredients | Parts by Wt. | Compounding Conditions: WB, CS, MHO, AA, CBS, VTC; except as noted in process variations | Process Variations | Results on Test Slabs Hot Pressed Directly From Compound Particles | | Result On Test Slabs Formed From Compound Particles After Brief Hot Milling | | Results On Test Slabs Formed From Starting, Input Polymer Pellets, Without Filler | |
|---|---|---|---|---|---|---|---|---|---|
| | | Temp. °C | | (T/E$_a$) | SG | (T/E$_a$) | SG | (T/E$_a$) | SG |
| Polyvinyl chloride, Pliovic K90E Powder (0.12 mm. dram.) | 100 | C1, 150-170 | Added last half of plasticizer oil at 150-170° C. | 1692/222 | 1.36 | 1968/180 | 1.36 | | |
| Whiting | 45 | C2, 115-150 | without curing agent for equilibration only. Obtained compound as particles up to 4.0 mm diameter, free of loose filler | | | | | | |
| 33 Clay | 10 | | | | | | | | |
| DIDP | 78 | | | | | | | | |
| Polyphenylene oxide Gen. Elec. Noryl 731 Pellets (3.5 × 2.5 × 1.8mm) | 145 | C1, 200-250 | Heating tape, 220° C, wrapped about blender jar. Used N$_2$ atmosphere. Obtained compound as plate-like particles up to 1 mm dia., free of loose filler. | | 1.34 | Not Milled | | | 1.05 |
| 3071 Treated Clay | 60 | | | | | | | | |
| Polyamide Nylon - du Pont Zytel, Colorless Translucent Pellets (4 × 4 × 1.5mm) | 100 | C1, 200-230 | Obtained filled compound particles as plates and fibrils, with uniformly black interiors. | | 1.28 | Not Milled | | | 1.02 |
| 3071 Treated Clay | 50 | | | | | | | | |
| Flectol H | 1.8 | | | | | | | | |
| Thermax MT | 5 | | | | | | | | |
| Polycarbonate Gen. Elec. Lexan, Colorless, clear, rod-like pellets (2.5 × 3.5mm) | 100 | C1, 175-225 | Obtained filled compound particles as small, flattened, tear drops | | 1.33 | Not Milled | | | 1.17 |
| 3071 Treated Clay | 50 | | | | | | | | |
| Thermax MT | 5 | | | | | | | | |
| Polyurethane Roylar Black Rod-like pellets (3 × 4 × 6mm) | 125 | C1, 150-185 | Used N$_2$ atmosphere Obtained compound particles, from very fine up to 8mm dia., free of loose filler | 1591/120 | 1.61 | 2256/255 | 1.47 | 2391/585 | 1.27 |
| 3071 Treated Clay | 63 | | | | | | | | |
| Styrene Acrylonitrile Tyril 867, colorless clear pellets (2.5 × 3.0 × 3.5mm) | 100 | C1, 130-145 C2, 120-135 | Added oil in ten increments, over 50-130° C. Without curing agent, for equilibration only. Obtained filled Styrene Acrylonitrile particles free of loose filler | | 1.28 | Not Milled | | | 1.08 |
| 3071 Treated Clay | 50 | | | | | | | | |
| DIDP | 27 | | | | | | | | |
| Polymethylmethacrylate VM/100 clear transp. pellets (2 × 3 × 3.5mm) 3071 Treated Clay | 140 | C1, 188-194 | Preheated jar and contents to 180° C. Used N$_2$ atmosphere. Obtained a voluminous batch of fibrous filled particles | | 1.45 | Not Milled | | 1.16 | |
| Polypropylene Avisun 10-1016 clear, transp. pellets (2.5 × 3.5mm rods) | 100 | C1, 155-163 | Obtained hard, brittle particles of filled polypropylene. | | 1.16 | Not Milled | | | 0.88 |
| 3071 Treated Clay | 50 | | | | | | | | |
| Polystyrene Fostarene 20-D-9 clear, transp. pellets (2.0 × 3.0 × 4.5mm) 3071 Treated Clay | 138 | C1, 185-203 | Preheated jar and contents to 170° C. Obtained spheres of filled polystyrene, ranging up to 12 mm. dia. | | 1.27 | Not Milled | | 1.06 | |
| | 62 | | | | | | | | |
| Phenolic Resin, Genal 4000, BL-1431 | 190 | C1, 110-115 | Used exterior heating tape at 113° C for precise temp. control. Obtained 3071- | | 1.47 | Not Milled | | 1.44 | |

TABLE I-continued gray-green particles, up to 3.5mm dia. 3071 Treated Clay 10 — filled particles ranging up to 8 mm diameter.

| Ingredients | Parts by Wt. | Compounding Conditions All Experiments WB, CS, MHO, AA, CBS, VTC; except as noted in process variations | | Process Variations | Test Results on Cured Slabs Formed Directly From Compound Particles | | | | Test Results on Cured Slabs Formed From Compound Particles After Brief Hot Milling | | | |
|---|---|---|---|---|---|---|---|---|---|---|---|---|
| | | | Temp. °C | | $(T/E_a)$ | $(T/E_H)$ | % Tol Extr. | SG | $(T/E_a)$ | $(T/E_H)$ | % Tol Extr. | SG |
| Ethylene Vinyl Acetate Copolymer (DQD 1868) pellets (4 × 3.5mm) | 100 | C1, C2, C3, C4, C5, | 117–130 68–86 74–79 75–80 75–80 | | 1197/ 322 | 147/ 22 | 3.8 | | 2012/ 220 | 244/ 65 | | |
| Flectol H | 1.75 | | | | | | | | | | | |
| 3071 Treated Clay | 50 | | | | | | | | | | | |
| Di Cup R | 3.3 | | | | | | | | | | | |
| Ethylene Vinyl Acetate (DQD 1868) pellets | 100 | C1, | 80–130 | Added wood flour in eight increments, just as the batch was about to coalesce into a stagnant mass after previous | 1078/ 120 | | | 0.98 | 1585/ 440 | | | |
| Benzoyl Peroxide Powder (dissolved in Toluene) | 2.8 | C2, | 50–80 | increment. Used an air jet immersed in the stirring particles to sweep out solvent. | | | | | | | | |
| Chlorinated Polyethylene du Pont LD321 chunks (35 × 20 × 15mm) | 173 | C1, | 163–180 | Preheated blender jar and contents to 170° C, before starting to mix. Used N₂ atmosphere during mixing. Added peroxide to stirring compound particles and mixed at 40° C without coagulation. | 569/ 715 | | | 1.51 | 553/ 940 | | | 1.42 |
| 3071 Treated Clay | 63 | C2, | | | | | | | | | | |
| Di cup R | 0.9 | | | | | | | | | | | |
| Ethylene Propylene Rubber-Enjay Vistalon 404 chunks (20 × 15 × 10mm) | 100 | C1, | 150–200 | Preheated blender jar and contents to 150° C before starting to mix. After coagulation, water was added to cool the batch before C2. Water added to cool the batch before C3. Obtained small speres of filled EPR. By judicious addition of minor amounts of filler periodically, rubber particles could be maintained in free-flow particle condition for extended Periods of time. | 64/ 263 | | 42.6 | | 178/ 608 | | 31.4 | |
| 3071 Treated Clay | 50 | C2, | 50–80 | | | | | | | | | |
| Di Cup R | 3.3 | C3, | 55–60 | | | | | | | | | |
| Silicone Polymer (GE SE33) | 110 | C1, | 110–120 | Addition of fumed silica delayed until all 3071 had been taken up by SE33. | | | 3.5 | 1.28 | 180/ 78 | 100/ 25 | 3.7 | 1.29 |
| 3071 Treated Clay | 50 | C2, | 70–80 | | | | | | | | | |
| Treated Fume Silica | 11 | | | | | | | | | | | |
| Benzoyl peroxide Powder | 2.5 | | | | | | | | | | | |

TABLE II

| Ingredients | Parts by Wt. | Compounding Conditions All Experiments WB, CS, MHO, AA, CBS, VTC; except as noted in process variations | | Process Variations | Test Results on Cured Slabs Formed Directly From Compound Particles | | | | Test Results on Cured Slabs Formed From Compound Particles After Brief Hot Milling | | | |
|---|---|---|---|---|---|---|---|---|---|---|---|---|
| | | | Temp. °C | | $(T/E_a)$ | $(T/E_H)$ | % Tol Extr. | SG | $(T/E_a)$ | $(T/E_H)$ | % Tol Extr. | SG |
| Polyethylene (R4) | 100 | C1, C2, | 115–124 80–101 | | 1340/ 55 | | 16.5 | 0.94 | 1548/ 370 | 8/10 | | |

TABLE II-continued

| Ingredients | Parts by Wt. | Compounding Conditions All Experiments WB, CS, MHO, AA, CBS, VTC; except as noted in process variations | Process Variations | Test Results on Cured Slabs Formed Directly From Compound Particles | | | Test Results on Cured Slabs Formed From Compound Particles After Brief Hot Milling | | | |
|---|---|---|---|---|---|---|---|---|---|---|
| pellets (4.0mm dia.) Wood Flour Flectol H Thermax MT Di Cup R | 20 1.75 5 3.3 | C3, 80-101 | | | | | | | | |
| Same as above + 3 parts ASTM No. 2 oil | | C1, 115-124 C2, 80-101 C3, 80-101 | | 1222/ 33 | | 21.5 | 0.99 | 1286/ 220 | 27/31 | |
| Polyethylene (R4) Treated Fume Silica Flectol H Thermax MT Di Cup R | 100 20 1.75 5 3.3 | C1, 115-130 C2, 86-101 C3, 86-101 | | 1658/ 322 | | 11.4 | 1.03 | 2932 450 | 202/ 232 | |
| Polyethylene (R4) Treated Fume Silica Di Cup R | 100 5 3.3 | C1, 105-120 C2, 86-101 C3, 86-101 | Added filler in ten increments. Each increment added just as the batch was about to coalesce into a stagnant mass after the previous filler addition | 2274/ 435 | 94/ 79 | 10.6 | 0.91 | 2142/ 310 | 146/ 65 | |
| Polyethylene (R4) Red Iron Oxide 5560 Di Cup R | 100 100 3.3 | C1, 115-131 C2, 86-101 C3, 86-101 | | 1558/ 10 | | 50.0 | 1.51 | 1528/ 100 | 5/ 602 | |
| Polyethylene (R4) Pyrex Glass Wool Vinyl Silane (3933) Di Cup R | 100 20 1.0 3.3 | C1, 105-115 C2, 86-101 | | 1486/ 80 | | 8.0 | 1.03 | 1606/ 130 | | |
| Polyethylene Hydral 705 Hydrated Alumina Thermax MT Flectol H Di Cup R | 100 50 5 1.75 3.3 | C1, 105-128 C2, 86-101 C3, 77-101 | | 1251/ 34 | 126/ 95 | 11.0 | 1.14 | 2372/ 420 | 152 132 | |
| Polyethylene (R4) Cotton Fibers (1 × 3 – 30 mils) Di Cup R | 100 20 3.3 | C1, 110-126 C2, 86-101 | | 1256/ 22 | 12/ 8 | 7.8 | 0.95 | 1437/ 60 | | |
| Polyethylene pellets Titanium Dioxide | 150 60 | C1, 100-105 | Added TiO₂ filler in twelve increments. Kept mixing temp. 3009-19 input pellets already contain peroxide. | 1560/ 15 | 183/ 45 | 6.0 | 1.74 | 1765/ 80 | 310/ 155 | 6.4 1.56 |

TABLE III

| Ingredients | Parts by Wt. | Compounding Conditions: WB, CS, MHO, CBS, VTC; Except As Noted In Process Variations & Comments | Process Variations And Comments | Test Results on Cured Slabs Formed Directly From Compound Particles | | | | Test Results on Cured Slabs Formed From Compound Particles After Brief Milling | | | |
|---|---|---|---|---|---|---|---|---|---|---|---|
| | | Temp. °C | | $(T/E)_o$ | $(T/E)_H$ | % Tol Extr. | SG | $(T/E)_o$ | $(T/E)_H$ | % Tol Extr. | SG |
| High Density Polyethylene (Monsanto MPE 240-17555) pellets (3.0 × 3.5mm dia) Flectol H 3071 Treated Clay Thermax MT Di Cup R | 100 1.75 50.5 5 3.3 | C1, 135-145 C2, 100-125 C3, 85-90 | For equilibration only, no curing agent added. Added curing agent to stirring particles. No coalescence into a mass. | 1071/ 10 | 214/ 50 | 11.2 | 1.21 | 1414/ 10 | 230/ 70 | 15.7 | 1.21 |
| Low Density Polyethylene (R4) pellets | 100 | C1, 100-125 | | 1564/ 80 | 48/ 15 | 8.7 | 1.18 | 2264/ 245 | | | |

TABLE III-continued

| Ingredients | Parts by Wt. | Compounding Conditions: WB, CS, MhO, CBS, VTC; Except As Noted In Process Variations & Comments | | Process Variations And Comments | |
|---|---|---|---|---|---|
| (4.0mm dia.) Flectol H | 1.75 | C2, | 85–100 | Added curing agent. Also silane filler treating | |
| Whitetex Clay | 50 | | | agent, ψwhich can be incorporated at this stage or | |
| Thermax MT | 5 | | | at the outset of compounding. The addition of sili- | |
| SC3933 Silane Treating Agent | 1.5 | | cone tetramer and of | | |
| Silicone Tetramer | 0.5 | | | SC3933 show both physical | |
| Di Cup R | 3.3 | | | & Chemical modification of fillers, "in situ" with this process. | |

| Ingredients | Parts by Wt. | Compounding Conditions: WB, CS, MhO, CBS, VTC; Except As Noted In Process Variations & Comments | | Process Variations And Comments | Test Results on Compound Particles After Direct Feeding Into Ordinary Extruder, Extruding Onto Wire, Steam Curing, Then Removing From Wire | | | |
|---|---|---|---|---|---|---|---|---|
| | | | Temp. °C | | (T/E) | (T/E)o | % Tol H Extr. | SG |
| High Density Polyethylene (Monsanto MPE 240-17555) pellets (3.0 × 3.5mm dia) | 100 | C1, C2, C3, | 135–145 100–125 85–90 | For equilibration only, no curing agent added. Added curing agent to stirring particles. No coalescence into a mass. | 2593/60 | 299/40 | 5.7 5. | 0.94 |
| Flectol H | 1.75 | | | | | | | |
| 3071 Treated Clay | 50.5 | | | | | | | |
| Thermax MT | 5 | | | | | | | |
| Di Cup R | 3.3 | | | | | | | |
| Low Density Polyethylene (R4) pellets (4.0mm dia.) | 100 | C1, | 100–125 | | | | | |
| Flectol H | 1.75 | C2, | 85–100 | Added curing agent. Also silane filler treating agent, which can be incorporated at this stage or at the outset of compounding. The addition of silicone tetramer and of SC3933 show both o & Chemical modification of fillers, "in situ" with this process. | | | | |
| Whitetex Clay | 50 | | | | | | | |
| Thermax MT | 5 | | | | | | | |
| SC3933 Silane Treating Agent | 1.5 | | | | | | | |
| Silicone Tetramer | 0.5 | | | | | | | |
| Di Cup R | 3.3 | | | | | | | |

| Ingredients | Parts by Wt. | Compounding Conditions WB, CS, MHD, CBS, VTC; Except As Noted In Process VAriations & Comments | | Process Variations And Comments | Test Results on Cured Slabs Formed Directly From Compound Particles | | | Test Results on Cured Slabs Formed From Compound Particles After Brief Milling | | | |
|---|---|---|---|---|---|---|---|---|---|---|---|
| | | | Temp. °C | | (T/E) | (T/E)o | % Tol H Extr. | SG | (T/E) | (T/E)o | % Tol H Extr. | SG |
| Low Density Polyethylene (R4) Pellets (4.0mm dia.) | 100 | C1, C2, | 100–124 88–100 | | 1052/30 | | 7.5 | | 1305/140 | | | |
| Flectol H | 1.75 | | | | | | | | | | | |
| Translink Treated Clay | 50 | | | | | | | | | | | |
| Di Cup R | 4.9 | | | | | | | | | | | |
| Low Density Polyethylene (R4) Pellets (4.0mm dia.) | 100 | C1, C2, | 100–120 79–100 | 50 Obtained particles of compound free of loose filler. | 1305/205 | | 11.7 | | 2433/ | | | |
| Flectol H. | 1.51 | | | | | | | | | | | |
| Thermax MT | 40 | | | | | | | | | | | |
| Di Cup R | 3.30 | | | | | | | | | | | |
| High Mol Wt. Low Density Polyethylene (DFD6005) (2.5 × 3.5mm) Pellets | 100 | C1, C2, C3, | 130–145 103–155 97–100 | Batch behavior very similar to that containing LDPE pellets. Only a higher compounding temp. was needed. For equilibration only, no curing agent added. Added curing agent to stirring particles. No coalescence into a mass. | 1570/345 | | 2.9 | | 2332/410 | 174/165 | | |
| Flectol H | 1.75 | | | | | | | | | | | |
| 3071 Treated Clay | 50.5 | | | | | | | | | | | |
| Thermax MT | 5 | | | | | | | | | | | |
| Di Cup R | 3.3 | | | | | | | | | | | |

Figure 4:
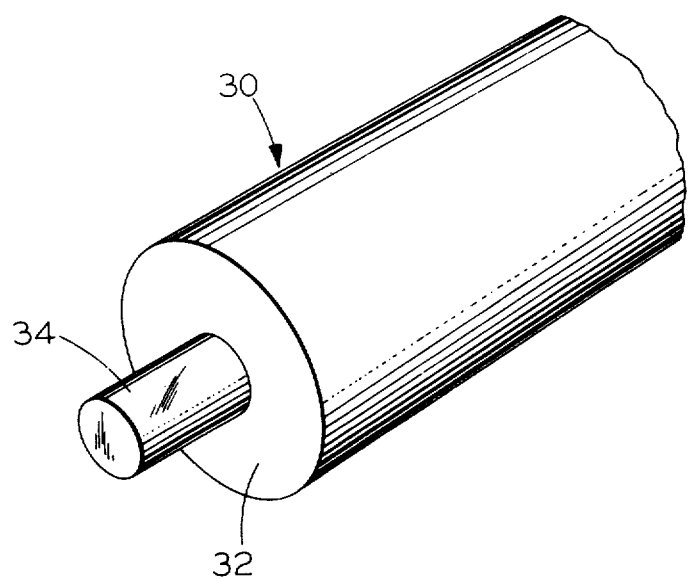

As indicated hereinbefore, this invention comprises the distinctive and advantageous compounded products of filled polymeric material of the method described, and their use, including molded or otherwise shaped articles formed therefrom, both in an uncured thermoplastic state and cured to a thermoset condition. The invention particularly includes compounds of filled polyethylene, and blends or copolymers containing polyethylene, produced by the method for use as electrically insulating material in combination with metallic electrical conductors such as the insulated wire or cable 30 of FIG. 4. The unique stratified structure of the filler and polymer material attributable to the method appears to be especially significant in this service by enhancing the resistance of the compounded electrical insulation to high voltage stresses. Thus, although the method of compounding filled thermoplastic polymeric materials and the distinctive products thereof are suitable for use in a variety of molded products and services, this invention is especially directed to and includes curable filled polyolefin polymeric compounds for use as electrically insulating metallic conductors, and curable, filled polymeric compounds of the invention are easily amenable to extrusion with conventional apparatus and processes, in forming an insulating covering 32 over wire or cable conductor strands 34.

Additionally, the compounded products of the invention are amenable to curing for conversion of the initially thermoplastic polymeric material to an essentially thermoset condition by means of conventional techniques comprising the use of curing agents, such as cross-linking peroxides, or measures such as irradiation, appropriate for the particular polymeric constituents. For instance the preferred polyethylene containing compounds of this invention can be effectively cured by adding an appropriate cross-linking peroxide such as taught in the prior art and subjecting the curable compound containing the curing agent to sufficient heat to activate the peroxide curing agent through its thermal decomposition, pursuant to the prior art such as described in U.S. Pat. Nos. 3,888,424 and 3,079,370.

The method of this invention is applicable to the compounding of a variety of polymeric compositions and products for various services. However, the invention is especially useful in compounding polyolefin materials comprising polyethylene, blends of polyethylene and other polymers, and copolymers of ethylene and other polymerizable materials. Typical polymeric and filler materials, and their compounding, and curing means, to which this invention is directed are set forth in U.S. Pat. Nos. 2,888,419; 2,888,424; 2,924,559; 2,928,801; 2,991,268; 3,039,989; 3,061,594; 3,148,169; 3,334,080; 3,362,924; 3,494,883 and 3,553,348.

What we claim as new and desire to secure by Letters Patent of the United States is:

1. The method of manufacturing an electrically insulated conductor having an insulation of a compound comprising thermoplastic polymeric material and filler, comprising the steps of:
   a. mixing particles of thermoplastic polymeric material with particulate filler proportioned in amounts ranging from at least 5 to about 200 parts by weight of the filler per 100 parts by weight of the polymeric material while melting surface portions of the particles of polymeric material, whereby the filler is blended with the melting surface portions of said polymeric particles and the resultant blend of the melted polymeric material and filler is removed from the remaining portion of the polymeric particles by the mixing action;
   b. continuing both the mixing of the particles of thermoplastic polymeric material with the filler and the melting of surface portions of said particles with the resulting blending of the melting surface portions and filler and the removal of the resultant blend of melted polymeric material and filler from said particles of polymeric material to effect a progressing melting and diminution of the said particles of polymeric material until greater than 50 % of the particulate polymeric material has become expended by melting and a majority of greater than 50% of the filler has become substantially assimilated into the polymeric material whereby said polymeric material and filler are substantially compounded to a free flowing particulate from comprising discrete particles of the compounded blend of polymeric material and filler with said blend comprising fundamental units predominantly structure essentially of a stratified layer of the filler adhesively embraced by a film-like mass of polymeric material; and,
   c. extruding the resultant compound about a core of metallic electrical conductor.

2. The method of manufacturing an electrically insulated conductor having an insulation of a compound comprising thermoplastic polymeric material and filler according to claim 1, wherein the compound of polymeric material and filler is cooled, and a cross-linking curing agent is added to and dispersed throughout the compound.

3. The method of manufacturing an electrically insulated conductor comprising thermoplastic polymer material and filler according to claim 2, comprising curing the resulting compound extruded about a core of metallic electrical conductor.

4. The method of manufacturing an electrically insulated conductor having an insulation of a compound of thermoplastic polyolefin polymeric material and filler, comprising the steps of:
   a. mixing particulate thermoplastic ethylene polymeric material of at least one member selected from the group consisting of polyethylene, blends of polyethylene and other polymers, and copolymers of ethylene and other polymerizable materials, and particulate filler proportioned in amounts ranging from at least 5 to about 200 parts by weight of the filler per 100 parts by weight of the polymeric material while melting surface portions of the particles of ethylene polymeric material, whereby the filler is blended with the melting surface portions of said particles of ethylene polymeric material and the resultant blend of the melted material and filler is removed from the remaining portions of the particles of ethylene polymeric material by the mixing action;
   b. continuing the mixing of the particulate thermoplastic ethylene polymeric material with the filler and the melting of surface portions of said particles with the resulting blending of the melting surface portions and filler and the removing of the resultant blend of melted material and filler to effect a progressive melting and diminution of the said particles of ethylene polymeric material until greater than 50% of the particulate polymeric material has become expended by melting and at least a majority of greater than 50% of the filler has become substantially assimilated into the polymeric material whereby said ethylene polymeric material and filler are substantially completely compounded to a free flowing particulate form comprising particulates of the compounded blend of polymeric material and filler with said blend comprising fundamental units predominantly structured essentially of a stratified layer of the filler adhesively embraced by film-like mass of polymeric material; and, c. extruding the resultant compound about a core of metallic electrical conductor.

5. The method of manufacturing an electrically insulated conductor having an insulation of a compound comprising thermoplastic ethylene polymeric material with filler according to claim 4, wherein the mixing of the particulate thermoplastic ethylene polymeric material and filler is effected with a high energy and high velocity mixing action whereby the melting of the surface portions of the particles of ethylene polymeric material is at least partially effected by the heat generated by the attrition of particles of ethylene polymeric material and filler.

6. The method of manufacturing an electrically insulated conductor having an insulation of a compound comprising theremoplastic ethylene polymeric material with filler according to claim 5, wherein heat from an external source is applied to the mixing particles of ethylene polymeric material and filler to augment the heat generated by the attrition of mixing particles of ethylene polymeric material and filler.

7. The method of manufacturing an electrically insulated conductor having an insulation of a compound comprising thermoplastic polymeric material and filler according to claim 6, wherein the amount of filler mixed with the polymeric material is approximately 25 to approximately 200 parts by weight per 100 parts by weight of the polymeric material.

8. The method of manufacturing an electrically insulated conductor having an insulation of a compound comprising thermoplastic polymeric material and filler according to claim 7, wherein the filler is a finely divided powder.

9. The method of manufacturing an electrically insulated conductor having an insulation of a compound comprising thermoplastic polymeric material and filler according to claim 8, wherein the compound of polymeric material and filler is cooled and a cross-linking curing agent is added to and dispersed through the compound.

10. The method of manufacturing an electrically insulated conductor having an insulation of a compound comprising thermoplastic polymeric material and filler according to claim 9, wherein the cross-linking curing agent is peroxide.

11. The method of manufacturing an electrically insulated conductor comprising thermoplastic polymeric material and filler according to claim 10, comprising curing the resulting compound about a core of a metallic electrical conductor.

12. The method of manufacturing an electrically insulated conductor having an insulation of a compound comprising thermoplastic polymeric material and filler, comprising the steps of:

a. mixing particles of thermoplastic polymeric material with particulate filler proportioned in amounts ranging from at least 5 to about 200 parts by weight of the filler per 100 parts by weight of the polymeric material in a high velocity impeller mixer while melting surface portions of the particles of polymeric material, whereby the filler is blended with the melting surface portions of said polymeric particles and the resultant blend of the melted polymeric material and filler is removed from the remaining portion of the polymeric particles by the mixing action;

b. continuing both the mixing of the particles of thermoplastic polymeric materials with the filler in the high velocity impeller mixer and the melting of the surface portions of the said particles with the resulting blending of the melting surface portions and filler and the removal of the resultant blend of melted polymeric material and filler from said particles of polymeric material to effect a progressive melting and diminution of the said particles of polymeric material until greater than 50% of the partiulate polymeric material has become expended by melting and a majority of greater than 50% of the filler has become substantially assimilated into the polymeric material whereby said polymeric material and filler are substantially compounded with said compound comprising fundamental units predominantly structure essentially of a stratified layer of the filler adhesively embraced by a film-like mass of polymeric material; and, c. extruding the resultant compound about a core of metallic electrical conductor.

13. The method of claim 12, wherein the proportion of filler to polymeric material is in amounts ranging from about 25 parts to about 200 parts by weight of filler per 100 parts by weight of polymeric material.

14. The method of claim 13, wherein the filler is of relativey smaller average particle size than the original average size of the particles of polymeric material and said polymeric material comprises a polyolefin.

15. The method of manufacturing an electrically insulated conductor having an insulation of a compound comprising thermoplastic ethylene-containing polymeric material and filler, comprising the steps of:

a. mixing with high energy and high velocity particles of ethylene-containing polymeric material of at least one member selected from the group consisting of polymethylene, blends of polyethylene and other polymers, and copolymers of ethylene and other polymerizable materials sized substantially within the range of approximately 2 to approximately 8 millimeter in diameter with particulate filler sized substantially within the range of approximately 149 microns to approximately 37 microns in diameter, said particles of polymeric material and filler being proportioned in amounts ranging from about 25 to about 200 parts by weight of filler per 100 parts by weight of polymeric material, in a high velocity impeller mixer, and heating the surface portions of the particles of ethylene-containing polymeric material to at least approximately the melting temperature of the polymeric material and thereby melting said surface portions of the polymeric particles whereby the filler is blended with the melting surface portions of the polymer particles and the resultant blend of the melted polymeric material and filler is removed from the remaining portion of the particles by the attrition effects of the mixing action;

b. continuing the high energy and high velocity mixing action in the high velocity impeller mixer with the heating and melting of surface portions of said particles of polymeric material and the resultant blending of the melted surface portions and filler and the removal of the resultant blend of melted polymeric material and filler to effect a progressive melting and diminution of said particles of polymeric material until greater than 50% of the particulate polymeric material has become expended by melting and at least a majority of greater than 50% of the filler has become substantially assimilated into the polymeric material whereby said polymeric material and filler are substantially compounded to a free flowing particulate form comprising discrete particles of the compounded blend of polymeric material and filler with said blend comprising fundamental units predominantly structured essentially of a stratified layer of the filler adhesively embraced by a film-like mass of polymeric material; and, c. extruding the resultant compound about a core of metallic electrical conductor.

* * * * *